July 14, 1925.
J. L. EVERSON
1,545,889
ROPE HITCH
Filed Dec. 27, 1923
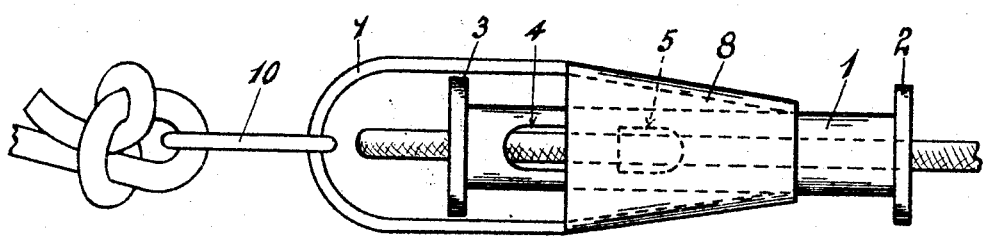
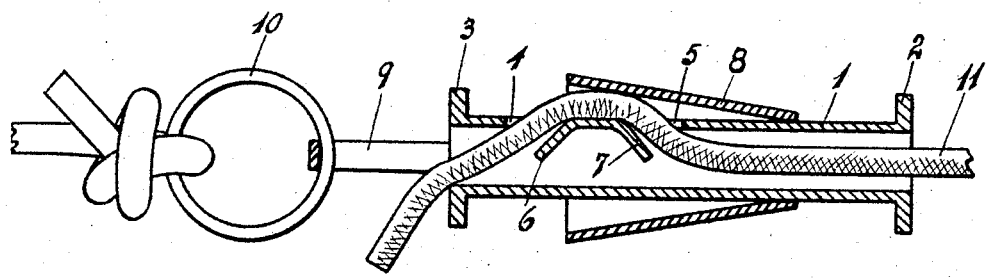
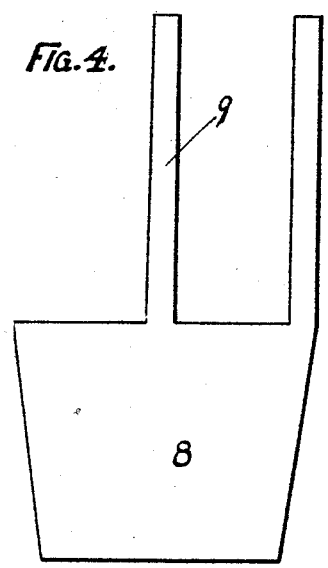
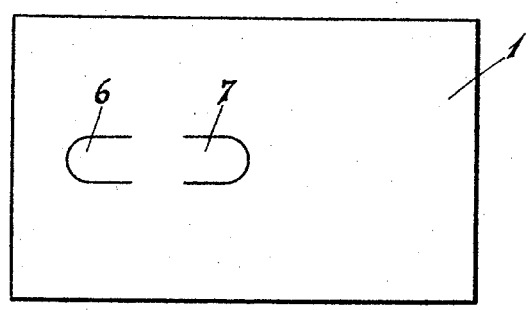
INVENTOR
JOHN LEWIS EVERSON.
BY
ATTORNEY Patented July 14, 1925.

1,545,889

UNITED STATES PATENT OFFICE.

JOHN LEWIS EVERSON, OF OAKLAND, CALIFORNIA.

ROPE HITCH.

Application filed December 27, 1923. Serial No. 682,948.

*To all whom it may concern:*

Be it known that I, JOHN LEWIS EVERSON, a citizen of the United States, residing at Oakland, in the county of Alameda and State of California, have invented certain new and useful Improvements in Rope Hitches, of which the following is a specification.

My invention is an improved rope or cable hitch.

The object of my invention is to provide a hitch in which the rope or cable is tenaciously gripped, and which will quickly and easily release the rope when desired.

Another object is to provide a hitch which is simple in construction, inexpensive to manufacture and effective in operation.

In the annexed drawing in which I have shown the preferred form of my invention:

Figure 1 is a plan view of my hitch.

Figure 2 is a transverse sectional view of the same.

Figure 3 is a development of the tube.

Figure 4 is a development of the sleeve.

Referring more particularly to the drawing, my hitch comprises a cylindrical conduit 1 which has flanges 2 and 3 formed at either end thereof, the purpose of which will be further described. Two openings 4 and 5 are formed adjacent one end of the conduit 1, which are preferably formed as shown in Figure 3, that is, the conduit 1 is first stamped from a sheet of metal, and tongues 6 and 7 are also stamped therein. These tongues are bent downwardly as shown in Figure 2 to form the openings 4 and 5 and also provide a smooth runway for the rope or cable. The tongues also act to reinforce the tube from collapsing under the pressure of the wedge. The plate shown in Figure 3 is finally rolled to form the conduit 1. Although the method just described is the preferable way to form the conduit 1, I do not wish to confine myself to this construction. Wood may also be used if desired.

A sleeve 8 surrounds the conduit 1 and is tapered towards the lower end. A strap 9 is formed at one end of the sleeve 8 extending beyond the conduit 1, and one end of the rope or cable is adapted to be secured thereto. The rope may be secured directly to the strap or to a ring 10 encircling it.

The free end of the rope 11 extends through the conduit 1 out of the opening 5, through the opening 4 and out the other end of the conduit. When tension is applied to the rope 11 the part protruding from the conduit 1 is wedged between said conduit and the sleeve 8, holding the rope firmly against slipping. If it is desired to adjust the rope a slight pull on the free end of the rope 11 will free it from the sleeve 8. The flange 2 prevents the conduit from slipping out of the sleeve 8 during adjustment, and the flange 3 keeps the conduit from falling out of the sleeve when no rope is inserted.

I have here described the preferred embodiment of my invention, but it may also be embodied in other forms, and in this application I desire to cover it in whatever form it may be embodied.

Having described my invention, I claim:

1. A rope hitch comprising a conduit, said conduit having openings therein through which the rope extends, and a tapered sleeve extending over said conduit to wedge the rope, and a strap formed on said sleeve to which one end of the rope is secured.

2. A rope hitch comprising a conduit, said conduit having openings therein through which the rope extends, a flange formed at each end of the conduit, and a tapered sleeve adapted to extend over the conduit and wedge the rope.

3. A rope hitch comprising a conduit, said conduit having openings therein through which the rope extends, said openings being formed by cutting tongues in the conduit and bending said tongues downwardly, and a sleeve in the shape of a hollow frustrum of a cone adapted to extend over the conduit and wedge the rope.

4. A rope hitch comprising a conduit, flanges formed at each end of said conduit, said conduit having openings therein thru which the rope extends and a tapered sleeve extending over said conduit to wedge the rope, said flanges serving as stops for said sleeve.

In testimony whereof I affix my signature.

JOHN LEWIS EVERSON.